(12) United States Patent
Chernoguzov et al.

(10) Patent No.: US 8,948,067 B2
(45) Date of Patent: Feb. 3, 2015

(54) WIRELESS CONTROLLER GRIDS FOR PROCESS CONTROL AND OTHER SYSTEMS AND RELATED APPARATUS AND METHOD

(75) Inventors: Alexander Chernoguzov, Warrington, PA (US); Pavel Trnka, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 1072 days.

(21) Appl. No.: 12/628,918

(22) Filed: Dec. 1, 2009

(65) Prior Publication Data

US 2010/0271989 A1 Oct. 28, 2010

Related U.S. Application Data

(60) Provisional application No. 61/171,989, filed on Apr. 23, 2009.

(51) Int. Cl.
| | |
|---|---|
| *H04B 7/00* | (2006.01) |
| *H04L 12/40* | (2006.01) |
| *G05B 19/418* | (2006.01) |
| *H04W 8/00* | (2009.01) |
| *H04W 84/18* | (2009.01) |

(52) U.S. Cl.
CPC .... *H04L 12/40006* (2013.01); *G05B 19/41855* (2013.01); *H04L 12/40176* (2013.01); *H04W 8/005* (2013.01); *G05B 2219/31165* (2013.01); *H04L 2012/4026* (2013.01); *H04L 2012/40273* (2013.01); *H04W 84/18* (2013.01)
USPC .......................................................... 370/310

(58) Field of Classification Search
CPC ................................................... H04W 24/02
USPC .................................................. 370/310, 410
See application file for complete search history.

(56) References Cited

U.S. PATENT DOCUMENTS

| | | | |
|---|---|---|---|
| 6,771,966 B1 * | 8/2004 | Chow | 455/446 |
| 6,865,591 B1 * | 3/2005 | Garg et al. | 709/201 |
| 7,792,126 B1 * | 9/2010 | Montestruque et al. | 370/400 |
| 7,860,495 B2 * | 12/2010 | McFarland | 455/420 |
| 8,350,691 B2 * | 1/2013 | McFarland | 340/506 |

(Continued)

OTHER PUBLICATIONS

Rahul Mangharam, et al., "Embedded Virtual Machines for Robust Wireless Control Systems", 29th IEEE Int'l. Conf. on Distributed Computing Systems, Jun. 2009, 6 pages.

(Continued)

*Primary Examiner* — Brandon Renner
*Assistant Examiner* — Faisal Choudhury

(57) ABSTRACT

A system includes a plurality of wireless nodes including multiple controller nodes. Each controller node is configured to execute at least one of multiple control algorithms for controlling at least a portion of a process. Each control algorithm is associated with one or more sensor nodes and/or actuator nodes. At least one wireless node is configured to distribute the control algorithms amongst the controller nodes. At least one wireless node may be configured to redistribute the control algorithms amongst the controller nodes in response to one or more triggering events. A triggering event could include a new controller node being added to the system, and at least one wireless node could be configured to redistribute the control algorithms amongst the controller nodes including the new controller node. Redistribution of control algorithms can change a physical location where at least one control algorithm is executed without interrupting control of the process.

24 Claims, 6 Drawing Sheets

(56) References Cited

U.S. PATENT DOCUMENTS

| | | | | |
|---|---|---|---|---|
| 8,582,470 | B2* | 11/2013 | Collins et al. | 370/254 |
| 2002/0045969 | A1* | 4/2002 | Dierauer | 700/223 |
| 2005/0005200 | A1* | 1/2005 | Matena et al. | 714/38 |
| 2005/0164684 | A1* | 7/2005 | Chen et al. | 455/414.1 |
| 2005/0201297 | A1* | 9/2005 | Peikari | 370/242 |
| 2006/0028997 | A1* | 2/2006 | McFarland | 370/252 |
| 2006/0120411 | A1* | 6/2006 | Basu et al. | 370/539 |
| 2008/0225737 | A1* | 9/2008 | Gong et al. | 370/252 |
| 2008/0267259 | A1 | 10/2008 | Budampati et al. | |
| 2009/0034457 | A1* | 2/2009 | Bahl et al. | 370/329 |
| 2009/0062931 | A1* | 3/2009 | Keyes et al. | 700/7 |
| 2009/0102640 | A1* | 4/2009 | McFarland | 340/539.1 |

OTHER PUBLICATIONS

Jason Hill, et al., "System Architecture Directions for Networked Sensors", ASPLOS-IX, Nov. 2000, Cambridge, MA, 12 pages.

Philip Levis, et al., "Mate: A Tiny Virtual Machine for Sensor Networks", ACM ASPLOS-X, 2002, 11 pages.

Phillip Stanley-Marbell, et al., "Scylla: A Smart Virtual Machine for Mobile Embedded Systems", in WMCSA, 2000, 10 pages.

Rene Muller, et al., "A Virtual Machine for Sensor Networks", ACM EuroSys, 2007, 14 pages.

Chih-Chieh Han, et al., "A Dynamic Operating System for Sensor Nodes", MobiSys, 2005: The Third International Conference on Mobile Systems, Applications, and Services, p. 163-176.

Adam Dunkels, et al., "Run-Time Dynamic Linking for Reprogramming Wireless Sensor Networks", SenSys '06, Nov. 1-3, 2006, Boulder, Colorado, 14 pages.

Rahul Mangharam, et al., "FireFly: A Cross-Layer Platform for Real-Time Sensor Networks", Real Time Systems Journal, 2007, 40 pages.

Jason Hill, et al., "The Platforms Enabling Wireless Sensor Networks", Communications of the ACM, Jun. 2004, vol. 47, No. 6, p. 41-46.

Anthony Rowe, et al., "RT-Link: A Time-Synchronized Link Protocol for Energy-Constrained Multi-hop Wireless Networks", IEEE SECON, 2006, 10 pages.

Rahul Mangharam, et al., "Voice over Sensor Networks", RTSS, 2006, 10 pages.

Joseph Polastre, et al., "Versatile Low Power Media Access for Wireless Sensor Networks", SenSys '04, Nov. 3-5, 2004, Baltimore, Maryland, 13 pages.

Wei Ye, et al., "An Energy-Efficient MAC protocol for Wireless Sensor Networks", USC/ISI Technical Report ISI-TR-543, INFOCOM, Jun. 2002, p. 1-10.

"FireFly 2.2 Datasheet", Wireless Sensor Networks, Aug. 20, 2007, 24 pages.

"Nano-RK: A Wireless Sensor Networking Real-Time Operating System", http://nanork.org/wiki, 3 pages.

* cited by examiner

WIRELESS CONTROLLER GRIDS FOR PROCESS CONTROL AND OTHER SYSTEMS AND RELATED APPARATUS AND METHOD

CROSS-REFERENCE TO RELATED APPLICATIONS

This application claims priority under 35 U.S.C. §119(e) to U.S. Provisional Application No. 61/171,989 filed on Apr. 23, 2009, which is hereby incorporated by reference.

TECHNICAL FIELD

This disclosure relates generally to control systems. More specifically, this disclosure relates to wireless controller grids for process control and other systems and related apparatus and method.

BACKGROUND

Many industrial automation and control applications involve geographically distributed sensors and actuators, which are typically connected to a central control room through wired networks. It is sometimes possible to reduce the amount of wiring through the use of wireless communications to and from the control room. While achieving some customer benefit (such as wiring reduction), this approach often does not solve the problem of fault tolerance required by closed-loop control applications. It also typically requires long-distance communications from the sensors to the control room and then back to the actuators, resulting in reduced reliability and added control latency.

SUMMARY

This disclosure provides a wireless controller grid for a process control or other system and related apparatus and method.

In a first embodiment, a system includes a plurality of wireless nodes including multiple controller nodes. Each controller node is configured to execute at least one of multiple control algorithms for controlling at least a portion of a process. Each control algorithm is associated with one or more sensor nodes and/or one or more actuator nodes. At least one of the wireless nodes is configured to distribute the control algorithms amongst the controller nodes.

In a second embodiment, a wireless node includes a transceiver configured to communicate with other wireless nodes within a wireless controller grid. The wireless node also includes a controller configured to execute at least one of multiple control algorithms for controlling at least a portion of a process. Each control algorithm is associated with one or more sensor nodes and/or one or more actuator nodes. The controller is configured to receive and execute different control algorithms over time as the control algorithms are dynamically distributed and redistributed in the wireless controller grid.

In a third embodiment, a method includes executing at least one of multiple control algorithms at a first wireless node in a wireless controller grid. The method also includes receiving and executing at least one different control algorithm at the first wireless node as the control algorithms are dynamically distributed and redistributed in the wireless controller grid.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 12, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
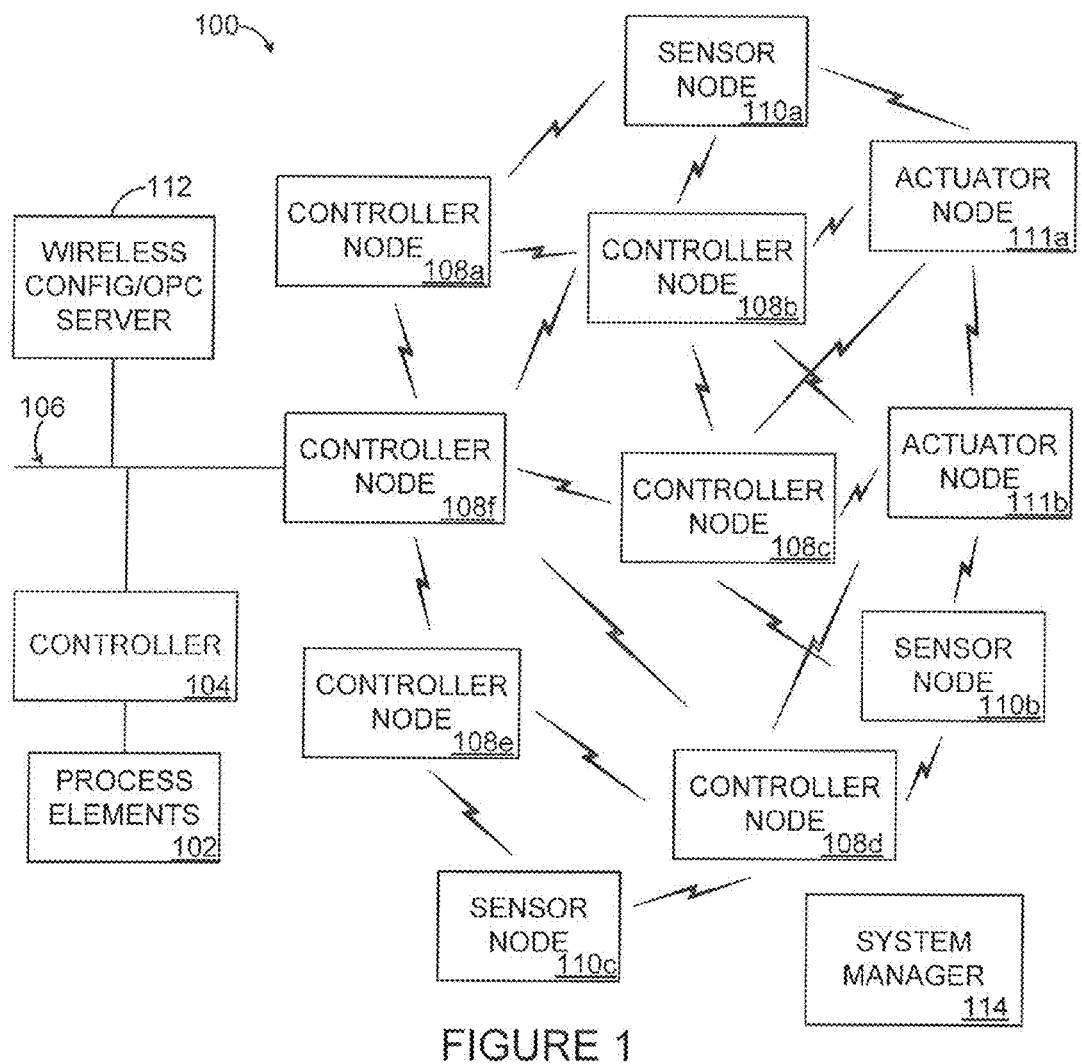
FIG. 1 illustrates an example industrial control and automation system supporting the use of one or more wireless controller grids according to this disclosure.

FIG. 1 illustrates an example industrial control and automation system 100 supporting the use of one or more wireless controller grids according to this disclosure. In this example embodiment, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system may represent any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to provide control signals to others of the process elements 102, thereby adjusting the operation of those process elements 102. The controller 104 includes any hardware, software, firmware, or combination thereof for controlling one or more process elements 102. The controller 104 could, for example, represent a computing device executing a MICROSOFT WINDOWS operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks (WANs), all or a portion of a global network, or any other communication system or systems at one or more locations.

In FIG. 1, the industrial control and automation system 100 also includes one or more wireless controller grids. In this example, a wireless controller grid includes one or more controller nodes 108a-108f, which communicate with one or more sensor nodes 110a-110c and/or one or more actuator nodes 111a-111b.

The controller nodes 108a-108f, the sensor nodes 110a-110c, and the actuator nodes 111a-111b engage in wireless communications with each other. For example, the controller nodes 108a-108f may receive sensor data transmitted wirelessly from the sensor nodes 110a-110c and transmit control signals to the actuator nodes 111a-111b. The controller nodes 108a-108f could also implement one or more control algorithms for using the sensor data from the sensor nodes 110a-110c to generate the control signals for the actuator nodes 111a-111b. Depending on the implementation, the controller nodes 108a-108f (and possibly also the sensor nodes 110a-110c and the actuator nodes 111a-111b) could route data amongst themselves so that data can propagate through the wireless controller grid. In this way, the controller nodes 108a-108f (and possibly also the sensor nodes 110a-110c and the actuator nodes 111a-111b) form a wireless mesh network than can be used to provide wireless coverage for a specified area, such as a large industrial complex.

In this example, one of the controller nodes 108f also facilitates communication over a wired network (network 106). For example, the controller node 108f may convert data between protocol(s) used by the network 106 and protocol(s) used by the controller nodes 108a-108f, the sensor nodes 110a-110c, and the actuator nodes 111a-111b. As particular examples, the controller node 108f could convert Ethernet-formatted data transported over the network 106 into a wireless protocol format (such as an IEEE 802.11a, 802.11b, 802.11g, 802.11n, 802.15.3, 802.15.4, or 802.16 format) used by the nodes of the wireless controller grid. The controller node 108f could also convert data received from one or more nodes of the wireless controller grid into Ethernet-formatted data for transmission over the network 106.

The controller nodes 108a-108f, the sensor nodes 110a-110c, and the actuator nodes 111a-111b include any suitable structures facilitating wireless communications, such as radio frequency (RF) frequency-hopping spread spectrum (FHSS) or direct sequence spread spectrum (DSSS) transceivers. The controller nodes 108a-108f, the sensor nodes 110a-110c, and the actuator nodes 111a-111b could also include any other suitable functionality. For example, the controller nodes could further communicate and interact with handheld user devices (such as INTELATRAC devices from HONEYWELL INTERNATIONAL INC.), mobile stations, programmable logic controllers, or any other or additional devices. Also, the functionality of a controller node could be combined with the functionality of a sensor and/or the functionality of an actuator.

A wireless configuration and OLE for Process Control (OPC) server 112 can configure and control various aspects of the industrial control and automation system 100. For example, the server 112 could configure the operation of the nodes 108a-108f, 110a-110c, 111a-111b. The server 112 could also support security in the industrial control and automation system 100, such as by distributing cryptographic keys or other security data to various components in the industrial control and automation system 100 (like the nodes 108a-108f, 110a-110c, 111a-111b). The server 112 includes any hardware, software, firmware, or combination thereof for configuring wireless networks and providing security information.

In particular embodiments, the various nodes in the wireless network of FIG. 1 form a mesh network communicating at 2.4 GHz or 5.8 GHz. Also, in particular embodiments, data can be injected into the wireless mesh network through the controller, sensor, or actuator nodes, thus providing versatile, multifunctional, plant-wide coverage for wireless sensing, asset location tracking, personnel tracking, wireless communications, and any other or additional functionality as desired.

In one aspect of operation, the system 100 includes or supports the formation and use of one or more wireless controller grids. The controller nodes 108a-108f can be implemented in a wireless manner and moved out into the field (such as within an industrial process facility) closer to the sensor nodes 110a-110c and the actuator nodes 111a-111b. The controller, sensor, and actuator nodes can then be interconnected via a wireless mesh network to support necessary or desired communications and data exchanges.

A wireless controller grid could contain or implement any of the following features. In some embodiments, any controller node can run a control algorithm associated with one or more sensor nodes and/or one or more actuator nodes. Also, control algorithms can be replicated and hosted by the "best" controller node(s) to handle the job. Here, a "best" controller node can be selected based on various factors, such as the number of communication links, the link quality of each of those links, the link bandwidth available on each of those links, the computational load of the controller node, and so on. In some embodiments, the "best" controller node has enough processing power to handle a control algorithm, a smaller number of links to reach out to its sensor and actuator nodes, and decent quality links that have enough bandwidth available on them. Any other or additional metric(s) can also be used.

Further, one or multiple backup controllers for a given control algorithm may be chosen to operate in a standby mode, where those backup controllers wait to take over in case a primary controller fails. Moreover, control algorithms can migrate from one controller node to another based on various factors, such as network conditions and fault tolerance requirements. Note that "control algorithm redundancy" is a new concept; "node redundancy" (the use of multiple physical controllers) is traditionally used to boost reliability. In addition, while sensor, controller, and actuator nodes logically have different roles, they may be physically combined in any suitable manner (such as when a single device is a sensor and a controller, an actuator and a controller, or a sensor, an actuator, and a controller). In systems using wireless controller grids, wireless controllers can be implemented as described below.

In this example, load balancing, control distribution algorithms, and other management functions can be implemented within the controller nodes or by a separate system manager 114 to manage the wireless controller grid. Among other things, these management functions allow the control algorithms to be dynamically distributed among the controller nodes and data to be routed to the appropriate controller nodes. The control algorithms can also be redistributed as conditions in the system change, such as when nodes or links fail or as nodes are added to or removed from the system. The system manager 114 includes any hardware, software, firmware, or combination thereof for managing the distribution and use of control algorithms. Although shown as a separate component, the system manager 114 could be incorporated into one or more other components, such as one or more wireless controller nodes.

The use of wireless controller grids can provide various benefits depending on the implementation. For example, wireless controllers can be placed in closer proximity to a process or system (such as an assembly line) being controlled. Also, there is no need for large controllers or input/output (IO) concentrators, and there is no need for fixed controller/ IO relationships or hierarchical plant organizations. Further, a required or desired degree of fault tolerance can be assigned to control algorithms on a per-control algorithm basis, providing greater flexibility in the design and implementation of the control algorithms. Moreover, controller loads can be managed dynamically, such as by adding or removing controllers as necessary, without affecting control execution. The physical location where a control algorithm is executed can change without interruption in the control of the process. In addition, this type of system can support high-speed control algorithms (such as those with a control cycle of a quarter second or less) and a small latency (such as those where less than a third of the control cycle is used for control algorithm execution).

As a particular example of how a wireless controller grid can be used, control engineers can design control algorithms without specific knowledge about which controller nodes will execute the control algorithms. The only design time inputs for a control algorithm could be the sensor nodes and the actuator nodes involved in the control algorithm's execution and the control algorithm itself. When the control algorithm is then provided to the wireless controller grid, the system can automatically designate an appropriate controller node or a set of controller nodes to execute the algorithm.

As another particular example of how a wireless controller grid can be used, it is possible to split a wireless controller grid into independent parts or to combine several independent controller grids into a single grid. This could be done, for instance, to support the use of movable equipment to solve a particular control problem in one area of a plant, followed by subsequent relocation of this piece of equipment to another area of the plant. A specific example of this is a fully-instrumented centrifuge used in the pharmaceutical industry, which may participate in one production line and then be relocated to another production line to participate in a different batch execution. One or more controllers mounted on the centrifuge can participate in either one of those batch line processes based on the physical location of the equipment. In other words, the controllers can participate in one part of the wireless controller grid or another part of the wireless controller grid based on the location of the equipment.

Although FIG. 1 illustrates one example of an industrial control and automation system 100 supporting the use of one or more wireless controller grids, various changes may be made to FIG. 1. For example, the industrial control and automation system 100 could include any number of process elements, controllers, networks (wired or wireless), system managers, wireless controller nodes, sensor nodes, actuator nodes, and servers. Also, the functional division shown in FIG. 1 is for illustration only. Various components in FIG. 1 could be combined, subdivided, or omitted and additional components could be added according to particular needs. Further, while the wireless controller grid is illustrated in FIG. 1 as being used in conjunction with a wired controller 104 and wired process elements 102, one or more wireless controller grids could be used in a system with or without other wired or wireless control elements. In addition, FIG. 1 illustrates one example operational environment where the use of wireless controller grids can be supported. This functionality could be used with any suitable device or system. Moreover, this functionality is not limited to use with process control systems/industrial control and automation systems and can be used to control any other suitable device or system. Other example uses include control of a building or campus heating, ventilating, and air conditioning (HVAC) system or use in a vehicle control unit.

Figure 2:
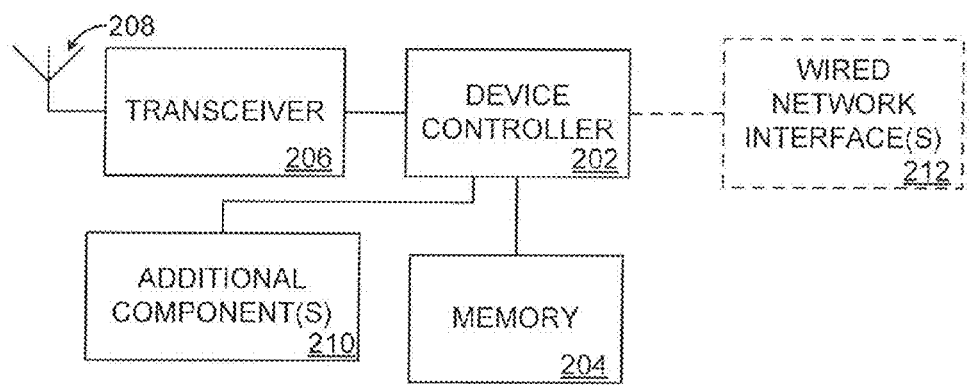
FIG. 2 illustrates an example wireless node in a wireless controller grid according to this disclosure.

FIG. 2 illustrates an example wireless node 200 in a wireless controller grid according to this disclosure. The wireless node 200 could, for example, represent a controller, sensor, or actuator node in the system 100 of FIG. 1 or other system.

As shown in FIG. 2, the node 200 includes a device controller 202. The device controller 202 controls the overall operation of the node 200. For example, the device controller 202 may receive or generate data to be transmitted externally, and the device controller 202 could provide the data to one or more other components in the node 200 for transmission over a wired or wireless network. The device controller 202 could also receive data over a wired or wireless network and use or pass on the data.

As particular examples, the device controller 202 in a sensor node could provide sensor data for transmission, and the device controller 202 in an actuator node could receive and implement control signals (note that a node could represent a combined sensor-actuator device). As another example, the device controller 202 in a wireless controller node could use sensor data received wirelessly from one or more sensor nodes and implement one or more control algorithms for generating control signals for one or more actuator nodes. The device controller 202 could perform any other or additional functions to support the operation of the node 200.

The device controller 202 includes any suitable hardware, software, firmware, or combination thereof for controlling the operation of the node 200. As particular examples, the device controller 202 could represent a processor, microprocessor, microcontroller, field programmable gate array (FPGA), or other processing or control device.

A memory 204 is coupled to the device controller 202. The memory 204 stores any of a wide variety of information used, collected, or generated by the node 200. For example, the memory 204 could store information received over one network that is to be transmitted over the same or different network. In a wireless controller node, the memory 204 could also store control algorithms or other instructions for implementing desired control logic. The memory 204 includes any suitable volatile and/or non-volatile storage and retrieval device or devices.

The node 200 also includes at least one wireless transceiver 206 coupled to at least one antenna 208. The transceiver(s) 206 and antenna(s) 208 can be used by the node 200 to communicate wirelessly with other devices. For example, in a sensor or actuator node, the transceiver(s) 206 and antenna(s) 208 can be used to communicate with one or more wireless controller nodes and optionally other sensor/actuator nodes. In a wireless controller node, the transceiver(s) 206 and antenna(s) 208 can be used to communicate with sensor and actuator nodes, other wireless controller nodes, and WiFi or other devices (such as hand-held user devices). Each transceiver 206 may be coupled to its own antennas 208, or multiple transceivers 206 can share a common antenna. Each transceiver 206 includes any suitable structure for generating signals to be transmitted wirelessly and/or receiving signals received wirelessly. In some embodiments, each transceiver 206 represents an RF transceiver, although each transceiver could include a transmitter and a separate receiver. Also, each antenna 208 could represent an RF antenna (although any other suitable wireless signals could be used to communicate).

If the node 200 represents a wireless controller node coupled to a wired network, the node 200 may further include one or more wired network interfaces 212. The wired network interfaces 212 allow the node 200 to communicate over one or more wired networks, such as the network 106. Each wired network interface 212 includes any suitable structure for transmitting and/or receiving signals over a wired network, such as an Ethernet interface.

A similar type of device could be used to implement the system manager 114. In that case, the device controller 202 could implement the logic for, among other things, distributing control algorithms to wireless controller nodes. The control algorithms could be stored locally to or within the system manager 114, or the control algorithms could be stored at some other position(s) accessible by the system manager 114 or the wireless controller nodes.

Although FIG. 2 illustrates one example of a wireless node 200 in a wireless controller grid, various changes may be made to FIG. 2. For example, various components in FIG. 2 could be combined, subdivided, or omitted and additional components could be added according to particular needs. Also, in general, a "wireless node" may represent any device that can transmit and/or receive data wirelessly (even if the "wireless node" has the ability to transmit and/or receive data over a wired connection, as well).

Figure 3A:
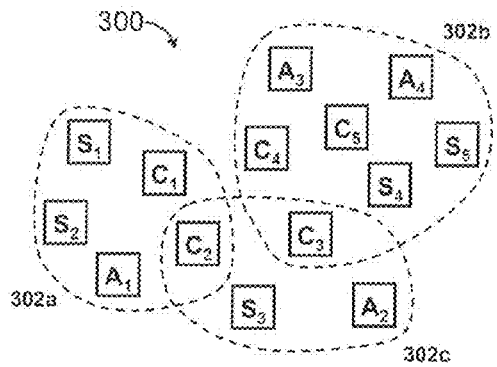
FIGS. 3A and 3B illustrate an example wireless controller grid supporting migration of control algorithms according to this disclosure.
Figure 3B:
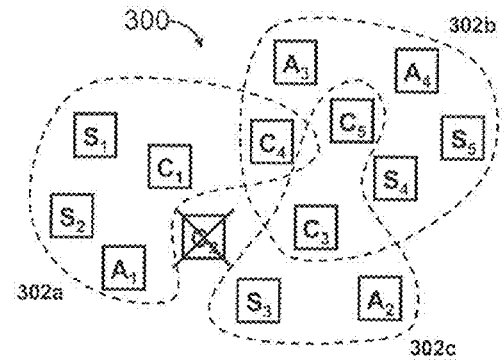

FIGS. 3A and 3B illustrate an example wireless controller grid 300 supporting migration of control algorithms according to this disclosure. In this example, the wireless controller grid 300 includes a number of controller nodes ($C_1$-$C_5$), sensor nodes ($S_1$-$S_5$), and actuator nodes ($A_1$-$A_4$) forming a mesh network. These nodes form a distributed control execution environment (CEE) in which control algorithms can be executed.

As shown in FIG. 3A, the wireless controller grid 300 supports three control loops 302a-302c. The loop 302a represents a multiple input, single output (MISO) control loop having multiple inputs ($S_1$ and $S_2$) and a single output ($A_1$). The loop 302b represents a multiple input, multiple output (MIMO) control loop having multiple inputs ($S_4$ and $S_5$) and multiple outputs ($A_3$ and $A_4$). The loop 302c represents a single input, single output (SISO) control loop having a single input ($S_3$) and a single output ($A_2$).

As shown in FIG. 3B, the wireless controller grid 300 can be configured to maintain dual or other redundancy for each control loop 302a-302c. In this example, the controller $C_2$ fails at some point, such as due to a failure of the controller $C_2$ itself or to a loss of communication with the controller $C_2$. This causes the controller $C_4$ to take over for the controller $C_2$ in the loop 302a. This also causes the controller $C_5$ to take over for the controller $C_2$ in the loop 302c. The control loop 302b may not be affected by the loss of the controller $C_2$.

In this example, various nodes in the wireless control grid 300 share a common sense of a control application without regard to physical node boundaries. Highly distributed, all-wireless control systems capable of high fidelity (tolerant to node and link failures) and real-time execution across multiple safety-critical and time-critical network elements can therefore be designed. Such wireless control systems can enable both incremental node additions to simple modular networks and on-demand adaptation to end-to-end processing requirements.

In industrial automation and control systems, wireless nodes and the wireless network as a whole may need to demonstrate a high level of reliability in the face of node and link failures and also support real-time requirements for closed-loop control. The wireless control grid 300 allows continuous and discrete network control systems to be designed and implemented in a process control system. The wireless control grid 300 provides a powerful and flexible programming abstraction where the control execution environment is maintained across node boundaries. This means that the wireless control grid 300 is composed across multiple physical nodes with one goal being to maintain correct and high-fidelity operation even under changes in the physical composition of the network. In the context of process and discrete control, this type of system can allow for on-demand reorganization of network elements in response to new requirements due to the presence of network or node failures, planned operational changes, and changes in the desired throughput or control capacity of the network.

In FIGS. 3A and 3B, the wireless control grid 300 can act as a single entity for control algorithm execution and can provide a flexible yet powerful programming abstraction to share state and responsibilities across physical nodes. This allows multiple nodes to be composed into a single logical entity for control algorithm execution.

Algorithm migration from one physical node to another node is another feature of this system. Control algorithm execution by one node can be passively observed by other nodes capable of executing the same algorithm. Control algorithm failure can be detected by backup observers, and a new master can be selected based on an arbitration algorithm. Abstraction can support built-in redundancy with backup and peering nodes and links that activate on-demand when a fault occurs. To address this, the wireless control grid 300 can support multiple physical nodes composed into a single virtual control execution environment. Thus, the failure of a single physical component or set of links may not cause the wireless control grid 300 to fail. Rather, if one of the nodes executing a control algorithm fails or loses contact, another node capable of performing the same control function can take over control execution.

A control element (a controller, sensor, or actuator node) may belong to one or more CEEs and arbitrate state information and message passing between CEEs. A CEE may be programmed as a single entity with a pre-specified membership of control elements. The system is also capable of automatic load balancing. When new nodes are added to the system, computing load can be redistributed from existing nodes to the newly added nodes based on, for example, their computing resources and proximity to a set of common sensors and actuators.

In particular embodiments, the controller nodes could represent small, cheap controllers with limited capabilities. As a particular example, the controller nodes could be capable of executing up to eight control loops. If more capacity is needed, additional controller nodes can be inserted into the wireless controller grid 300. Further, as noted above, automatic load balancing can be used to migrate controls algorithms from controller to controller. In addition, the wireless controller grid 300 can provide massive redundancy using redundant control algorithms, rather than redundant controllers (although redundant controllers are possible).

Although FIGS. 3A and 3B illustrate one example of a wireless controller grid 300 supporting migration of control algorithms, various changes may be made to FIGS. 3A and 3B. For example, the wireless controller grid 300 could include any number of controller, sensor, and actuator nodes. Also, a CEE could span any suitable portion of a mesh network or the entire mesh network. In addition, each controller, sensor, or actuator node could reside within one CEE or multiple CEEs.

Figure 4:
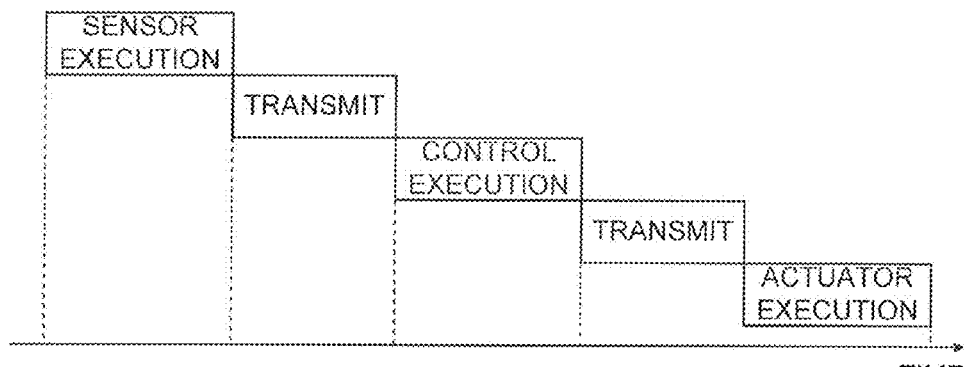
FIG. 4 illustrates an example timing diagram for operations in a wireless controller grid according to this disclosure.

FIG. 4 illustrates an example timing diagram 400 for operations in a wireless controller grid according to this disclosure. The nodes in a wireless controller grid can engage in time-synchronized communications and have time-synchronized execution of operations. In these embodiments, precision timing, scheduled tasks, and synchronized networking can be used so that the trade-offs between energy consumption (node lifetime), reliability, and responsiveness are specifiable and enforceable both at design time and at run time. Support for these services is often necessary for low-duty cycle and energy-constrained sensor networks because computations and communications are packed into a short duration so all nodes may maximize their common sleep time.

As shown in FIG. 4, the timing diagram 400 illustrates the synchronization of various operations used to tightly synchronize the nodes in a CEE. This can enable cooperative execution of control algorithms across multiple devices in the CEE. In this example, the timing diagram 400 includes five operations. These operations include sensor execution in which sensor data is collected by one or more sensors, followed by transmission of the sensor data. The operations also include control execution of a control algorithm (which uses the received sensor data) to generate a control signal, followed by transmission of the control signal to one or more actuators. The operations further include actuator execution, where one or more actuators operate in response to the control signal.

One benefit of tight time synchronization, as applied to control algorithm execution, is the ability to sense new values, perform control computations, and deliver new control signals to actuators all in lock-step with minimal latency as shown in FIG. 4. High-speed control based on a common sense of time is possible with the CEE. Wireless nodes can communicate in dedicated time slots to ensure collision-free operation over a wireless link.

Although FIG. 4 illustrates one example of a timing diagram 400 for operations in a wireless controller grid, various changes may be made to FIG. 4. For example, a wireless controller grid could support any additional operations according to particular needs.

Figure 6:
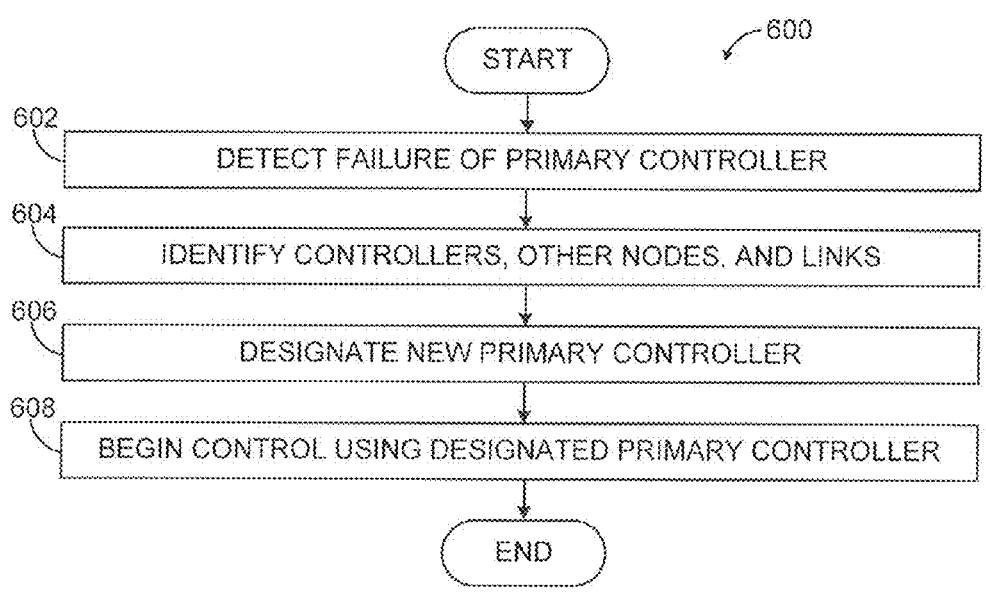
FIGS. 5 through 7 illustrate example methods for operating a wireless controller grid according to this disclosure.
Figure 5:
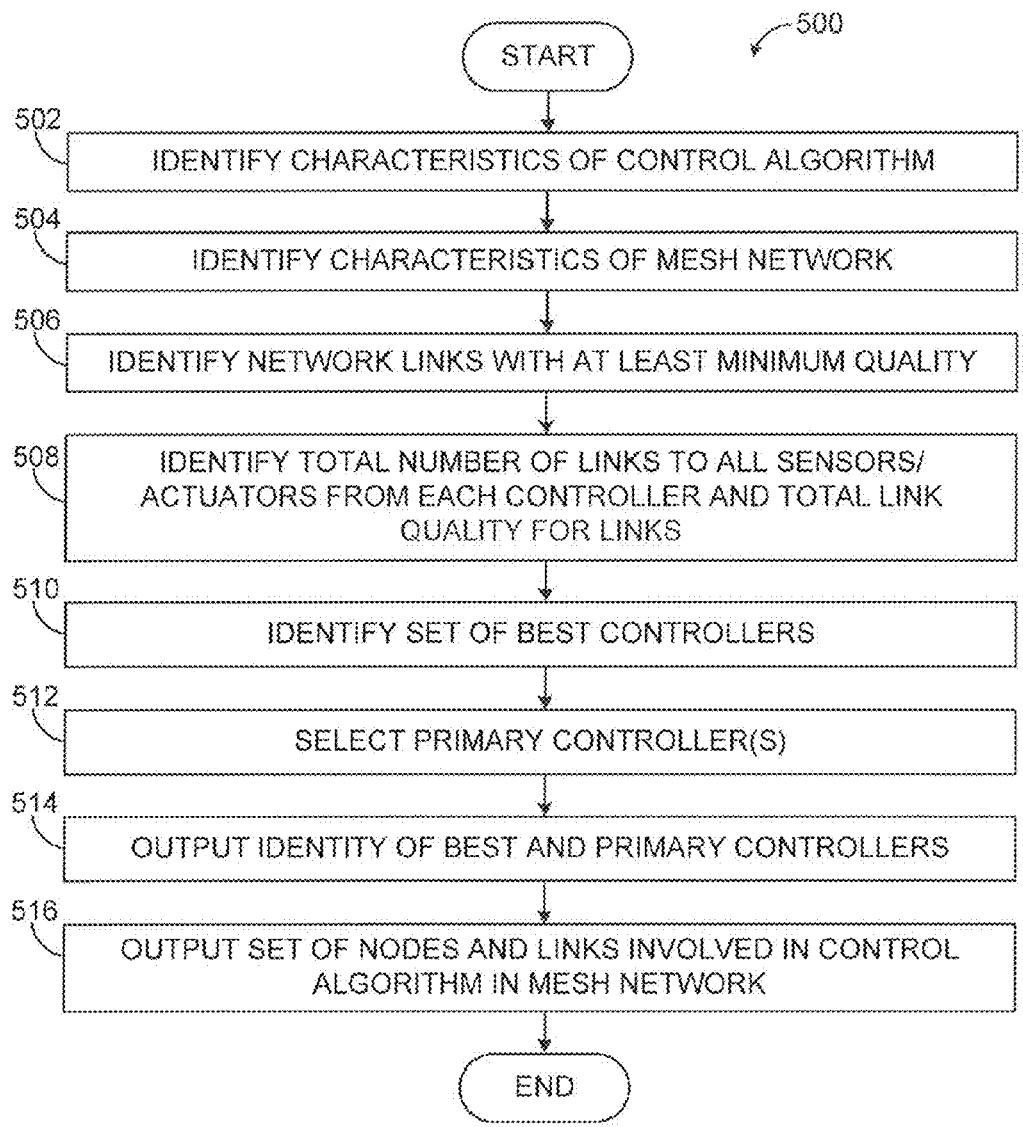
Figure 7:
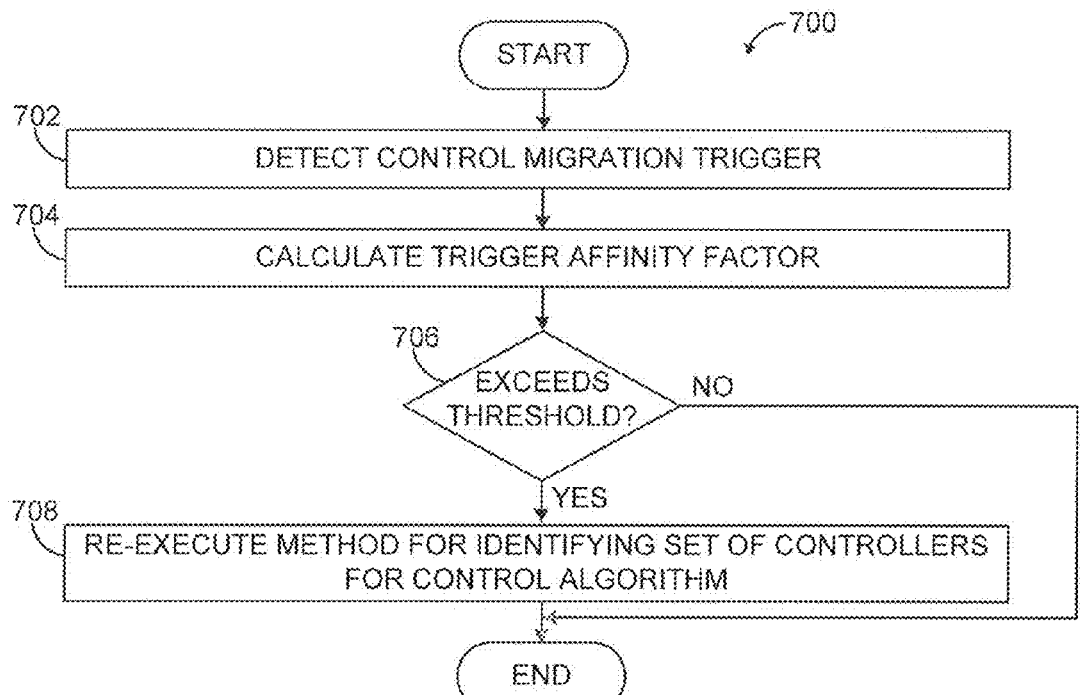
Figure 8:
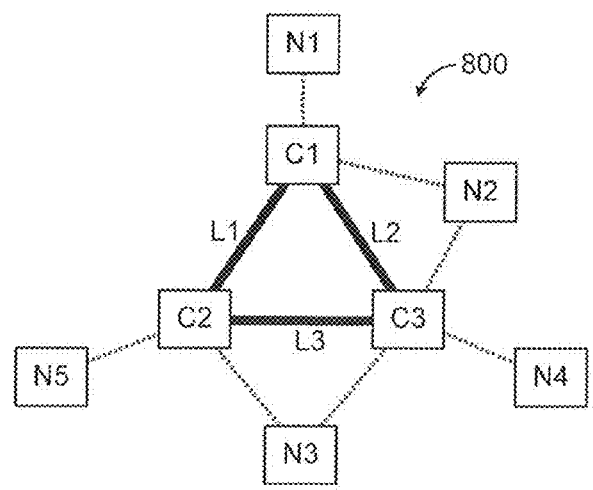
FIGS. 8 through 12 illustrate example details regarding distribution of control algorithms among controller nodes in a wireless controller grid according to this disclosure.

FIGS. 5 through 7 illustrate example methods for operating a wireless controller grid according to this disclosure. As shown in FIG. 5, a method 500 is used to determine a set of "best" controller nodes to execute a given control algorithm. The goal of the method 500 is to determine the best controller nodes that can execute a desired control function given a snapshot of current network conditions. As network conditions change, the method 500 can be re-executed to find a better or more up-to-date solution.

Characteristics of a control algorithm to be executed are identified at step 502. This could include, for example, identifying the control algorithm and the computing or processing requirements of the control algorithm. This could also include identifying a set of sensor nodes that provide inputs to the control algorithm and a set of actuators that are affected by the control algorithm's execution.

Characteristics of a mesh network are identified at step 504. This could include, for example, identifying the controller, sensor, and actuator nodes in the mesh network or part therefore and identifying a set of wireless links between the nodes (a fully connected mesh network could be assumed). This could also include identifying a link quality of each link, such as a quality expressed as a percentage of an ideal quality. This may further include identifying an available computing or processing capacity of each controller node. Links having at least some minimum quality are identified at step 506. These links may represent the only links to be used during execution of the control algorithm, and links having a quality below the threshold are disregarded.

Various characteristics of paths between the controller nodes and the sensors/actuator nodes involved in the control algorithm are identified at step 508. This could include, for example, identifying a total number of wireless links needed to reach all of the sensor and actuator nodes from each controller node. This could also include identifying the total aggregate link quality for the collection of links needed for each controller node to reach all sensor and actuator nodes involved in the control algorithm.

A set of best controller nodes for performing the control algorithm is identified at step 510. This could include, for example, identifying the controller nodes having fewer links to reach the sensor and actuator nodes. This could also include identifying the controller nodes having better aggregate link qualities. One or more primary controller nodes from the list are identified at step 512. This could include, for example, selecting the controller node with the minimum number of links and/or the best aggregate link quality. Depending on the implementation, weighting factors can be used to tune the method 500 to, for example, favor fewer links with lower quality versus more links of better quality. Note that some control algorithms may have a redundancy requirement where multiple controller nodes need to support the control algorithm. In these cases, multiple primary controller nodes could be selected.

At this point, the set of best controller nodes and the identity of the primary controller node(s) are output at step 514. Also, the nodes and links involved in execution of the control algorithm for each of the best controller nodes are output at step 516.

Note that various techniques for identifying the best controller nodes and for selecting the primary controller node(s) could be used, such as a centralized approach or a distributed approach. When a centralized algorithm is employed, a central location (such as the system manager 114) is assumed to have the knowledge of all constraints and can compute the outcome. In the distributed case, each node has a subset of information required to solve the complete problem and collaborate with neighboring nodes to compute the outcome.

In some embodiments, the method 500 can be expanded to take into consideration the use of time slots. In these embodiments, mesh network nodes can communicate using a pre-allocated time slot mechanism, and time slots can be assumed to be equal to each other and of fixed length (although this need not be the case). It may also be assumed that there are multiple time slots available per second in every node. The method 500 can be expanded to identify the best controller nodes while taking into account whether a controller node has available time slots for communications. In these embodiments, only controller nodes that have time slots available to schedule new communications between itself and the sensor and actuator nodes for a control algorithm may be considered during selection of the set of best controller nodes for that control algorithm. Also, the best controller nodes can be selected by taking into account aggregate latency (introduced by forwarding from one mesh node to another due to slotted medium access), which can be minimized.

As shown in FIG. 6, a method 600 is used to determine how to handle failures or other problems involving a primary controller node (which could occur after the method 500 is performed). This method 600 could represent a minimal-overhead controller arbitration algorithm. In some embodiments, the primary controller node (out of the set of best controller nodes selected to perform the control algorithm) actually performs the control function. The other controller nodes in the set can monitor the primary controller node and, when they detect that the primary controller node has failed, can initiate an election process to designate a new primary controller node to replace the failed one.

In FIG. 6, a failure of the primary controller node is detected at step 602. This could include, for example, one or more other controller nodes in the set detecting that the primary controller node itself has failed. This could also include detecting that all wireless links from the primary controller node to at least one sensor or actuator node has failed (meaning those links have a quality below some threshold). Passive observers (such as other controller nodes) can detect a failure of the primary controller node without interfering with their main control functions and without introducing a large amount of network communication overhead.

When the failure is detected and a decision is made to change to a new primary controller node, at least one other node identifies the set of best controller nodes, along with the network nodes and links associated with each controller node in the set of best controller nodes (identified earlier in method 500) at step 604. A new primary controller node is designated at step 606. This could include, for example, selecting a new primary controller node from the set of best controller nodes based on the number of links and aggregate link quality of the remaining controller nodes in the set. The new primary controller node is then used to perform the control algorithm at step 608.

As shown in FIG. 7, a method 700 is used for control algorithm migration. The goal of the method 700 is to use a set of triggers to initiate recalculation of the controller set determined by the method 500. The triggers can be selected to maximize the stability of the network and avoid unnecessary recalculations.

A control migration trigger is detected at step 702. Any suitable trigger events could be detected here. Example triggers include a link quality degradation below an acceptable threshold, a link quality improvement above the threshold, the addition of a new controller node to the network, or the removal of a controller node involved in the control algorithm's execution from the network.

A trigger affinity factor is determined at step 704. The trigger affinity factor may be calculated or can depend on the effect of the trigger on the currently-active links and nodes for a control algorithm. For example, an affinity factor of zero can be computed if a trigger involves a link that has not been involved in the execution of the control algorithm. An affinity factor of 100% can be computed if a trigger corresponds to the failure of the primary controller node executing the control algorithm. A determination is made whether the affinity factor exceeds some threshold at step 706. This can be done to help ensure that the trigger is strong enough to justify recalculation of the controller set. If the threshold is exceeded, the method for identifying the best controller nodes for the control algorithm is re-executed at step 708. This could include, for example, performing the method 500 again.

Although FIGS. 5 through 7 illustrate examples of methods for operating a wireless controller grid, various changes may be made to FIGS. 5 through 7. For example, any other suitable techniques could be used to select a set of best controllers nodes for a control algorithm, to select a primary controller node, to select a new primary controller node, and to trigger migration of the control algorithm. Also, while the method in each figure includes a series of steps, the steps in each figure could overlap, occur in parallel, occur in a different order, or occur multiple times.

FIGS. 8 through 12 illustrate example details regarding distribution of control algorithms among controller nodes in a wireless controller grid according to this disclosure. The problem of distributing multiple control algorithms among multiple controller nodes in a networked control system can be viewed as an optimization problem. Each control algorithm typically has a certain computational load, needs to communicate with a set of sensor and/or actuator nodes, and has to be executed in a certain number of instances (by one or multiple controller nodes). The optimization problem could include various constraints, such as the computational power of the controller nodes and the bandwidths and qualities of the wireless links. Various optimization factors could be used to determine the optimal optimization of a control algorithm, such as (in order of use):

minimization of the number of hops between a controller node and its needed sensor and/or actuator nodes, possibly with a preference for higher-quality links and an exclusion of links having a quality below some threshold;

an even distribution of computing or processing loads on the controller nodes;

an even distribution of communication traffic (link loads) on the wireless links; and robustness to link failure (without reallocation), meaning redundant paths exist for all communications involving a controller node and its sensor and actuator nodes.

In some embodiments, a linear/quadratic binary programming (LQBP) algorithm is used to solve the optimization problem. An example of the LQBP algorithm is described below with reference to FIG. 8, which shows a wireless controller grid 800 having three controller nodes C1-C3 and five sensor/actuator nodes N1-N5. Three links L1-L3 communicatively couple the controller nodes C1-C3. The LQBP algorithm allows the incorporation of the optimization factors mentioned above while respecting resources constraints. The LQBP algorithm can be used for any suitable network, such as those with several dozen nodes. It can also be used as a reference solution for suboptimal algorithms that are able to cope with larger networks. The LQBP algorithm could optimally allocate algorithms to controller nodes and also find the best communication paths, while supporting sensor and actuator nodes performing routing functions.

Figure 9:
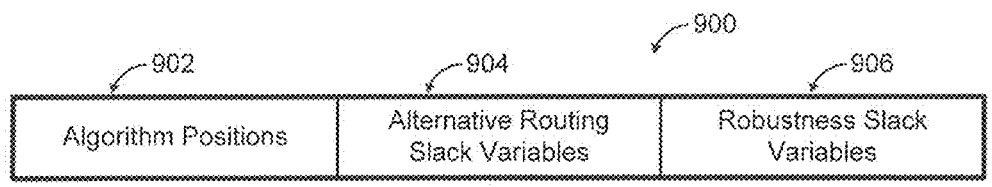

In particular embodiments, binary quadratic programming (BQP) is used to solve the optimization problem. The BQP algorithm can be used to solve the following optimization problem:

$$\min_x \frac{1}{2} x^T A x + b^T x, \text{ s.t. } x \in \{0, 1\}^n, Ax \le b, A_{eq} x = b_{eq}.$$

where an optimized vector x has the structure shown in FIG. 9. In FIG. 9, a vector 900 includes a first portion 902 defining algorithm positions, a second portion 904 defining alternative routing slack variables, and a third portion 906 defining robustness slack variables.

In the following discussion, it is assumed that the algorithms listed in Table 1 are being distributed.

TABLE 1

| Algorithm | Controller Load | Required Nodes |
|---|---|---|
| A1 | 50% | N2, N4 |
| A2 | 30% | N1, N3 |
| A3 | 40% | N3, N5 |
| A4 | 40% | N2, N4, N5 |

Figure 10:
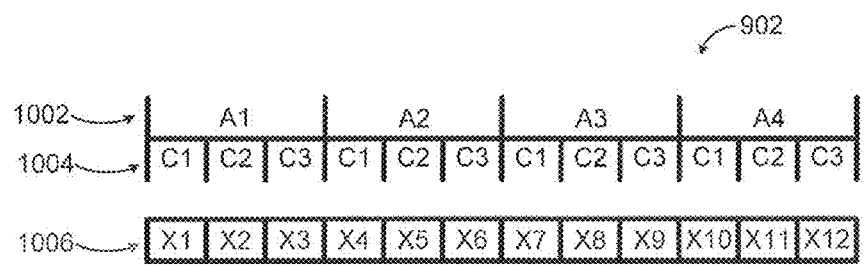

One example of the first portion 902 of the vector 900 is shown in FIG. 10. As shown in FIG. 10, the first portion 902 includes algorithm identifiers 1002, which identify the different control algorithms to be executed by controller nodes. In this example, there are four algorithms to be executed, which are denoted A1-A4. The first portion 902 also includes controller identifiers 904, which identify the different controller nodes. In this example, there are three controller nodes, which are denoted C1-C3. The three controller node identifiers are repeated in FIG. 10 since any of the algorithms A1-A4 could be executed by any of the controller nodes C1-C3.

The first portion 902 further includes bit values 1006. In this example, there are twelve bit values, which are denoted X1-X12. The bit values 1006 are used to indicate whether a corresponding controller node can execute one of the control algorithms. For example, a value of "1" at bit position X1 could indicate that the algorithm A1 can be executed on the controller node C1, and a value of "1" at bit position X2 could indicate that the algorithm A2 can be executed on the controller node C1. A value of "0" at bit position X3 could indicate that the algorithm A3 cannot be executed on the controller node C1. These values could be set, for example, based on the processing resources required by a control algorithm and the available resources on the controller nodes. Equality conditions can be added, such as:

$$\begin{pmatrix} 1 & 1 & 1 & 0 & 0 & 0 & 0 & 0 & 0 & 0 & 0 & 0 \\ 0 & 0 & 0 & 1 & 1 & 1 & 0 & 0 & 0 & 0 & 0 & 0 \\ 0 & 0 & 0 & 0 & 0 & 0 & 1 & 1 & 1 & 0 & 0 & 0 \\ 0 & 0 & 0 & 0 & 0 & 0 & 0 & 0 & 0 & 1 & 1 & 1 \end{pmatrix} \begin{pmatrix} x_1 \\ \vdots \\ x_{12} \\ \vdots \end{pmatrix} = \begin{pmatrix} 1 \\ 1 \\ 1 \\ 1 \end{pmatrix},$$

which could be used to assure that each algorithm runs on only one controller node. However, some robust control concepts may require each algorithm to be executed on more than one controller node, and equality conditions such as the following could be used:

$$\begin{pmatrix} 1 & 1 & 1 & 0 & 0 & 0 & 0 & 0 & 0 & 0 & 0 & 0 \\ 0 & 0 & 0 & 1 & 1 & 1 & 0 & 0 & 0 & 0 & 0 & 0 \\ 0 & 0 & 0 & 0 & 0 & 0 & 1 & 1 & 1 & 0 & 0 & 0 \\ 0 & 0 & 0 & 0 & 0 & 0 & 0 & 0 & 0 & 1 & 1 & 1 \end{pmatrix} \begin{pmatrix} x_1 \\ \vdots \\ x_{12} \\ \vdots \end{pmatrix} = \begin{pmatrix} R_1 \\ R_2 \\ R_3 \\ R_4 \end{pmatrix}$$

where $R_1$-$R_4$ represent values greater than or equal to one.

Figure 11:
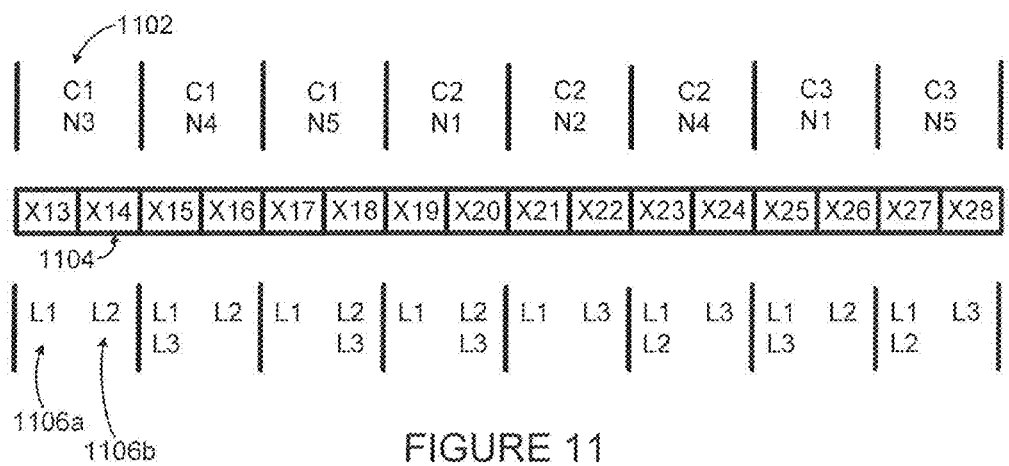

An example of the second portion 904 of the vector 900 is shown in FIG. 11, which includes controller-sensor/actuator node identifier pairs 1102. Each pair 1102 identifies one of the controller nodes C1-C3 and one of the sensor/actuator nodes S1-S5 that is not coupled directly to that controller node. The second portion 904 also includes two bit values 1104 and alternate route identifiers 1106a-1106b for each pair 1102. The alternate route identifiers 1106a-1106b identify different paths between the controller node and the sensor/actuator node for that pair 1102. For example, the route 1106a for the C1-N3 pair 1102 identifies link L1, and the route 1106b for the C1-N3 pair 1102 identifies link L2. Either path can be used for communications between the controller node C1 and the sensor/actuator node N3. Similarly, the route 1106a for the C1-N4 pair 1102 identifies links L1 and L3, and the route 1106b for the C1-N4 pair 1102 identifies link L2. Either path can be used for communications between the controller node C1 and the sensor/actuator node N4. The bit values 1104 are then used to denote which path is used for communications between two nodes. For example, bit values X13-X14 could be used to identify which path is used for communications between the controller node C1 and the sensor/actuator node N3.

Inequality conditions can be constructed to assure that one path is selected (by using a "1") only when a connection between a given controller node and a given sensor/actuator node is needed. Otherwise, the appropriate bit values 1104 are zero. The following inequality assumes a connection between the controller node C1 and the sensor/actuator node N3, which is needed when algorithm A2 and/or algorithm A3 runs on the controller C1 node:

$$\begin{pmatrix} 0 & 0 & 0 & 0 & 0 & 0 & 0 & 0 & 0 & 0 & 0 & 0 & 1 & 1 & 0... \\ 0 & 0 & 0 & 0 & 1 & 1 & 0 & 1 & 1 & 0 & 0 & 0 & 1 & 1 & 0... \\ 0 & 0 & 0 & 0 & -1 & -1 & 0 & 0 & 0 & 0 & 0 & 0 & -1 & -1 & 0... \\ 0 & 0 & 0 & 0 & 0 & 0 & 0 & -1 & -1 & 0 & 0 & 0 & -1 & -1 & 0... \end{pmatrix} x \leq \begin{pmatrix} 1 \\ 2 \\ -1 \\ -1 \end{pmatrix}.$$

In the third portion 906 of the vector 900, the robustness slack variables are used to optimize path selection in case of a single link failure. Implementation is similar as for the alternative routing slack variables in the second portion 904 of the vector 900.

Resources limits can be represented by linear inequalities. For example, a CPU/processing power limit could be represented by linear inequalities limiting the load on each controller node according to the control algorithms' distribution. The following represents one example of CPU/processing power inequalities:

$$\begin{pmatrix} 0.5 & 0 & 0 & 0.3 & 0 & 0 & 0.4 & 0 & 0 & 0.4 & 0 & 0 \\ 0 & 0.5 & 0 & 0 & 0.3 & 0 & 0 & 0.4 & 0 & 0 & 0.4 & 0 \\ 0 & 0 & 0.5 & 0 & 0 & 0.3 & 0 & 0 & 0.4 & 0 & 0 & 0.4 \end{pmatrix} \begin{pmatrix} x_1 \\ \vdots \\ x_{12} \\ \vdots \end{pmatrix} \leq \begin{pmatrix} 1 \\ 1 \\ 1 \end{pmatrix},$$

where each row represents the load of one controller node. The link bandwidth variables could represent linear inequalities used to limit the link load according to choice of alternative routes. The following represents one example of link bandwidth inequalities:

$$0.35 * \begin{pmatrix} \cdots & 1 & 0 & 1 & 0 & 1 & 0 & 1 & 0 & 1 & 0 & 1 & 0 & 1 & 0 & 1 & 0 & \cdots \\ & 0 & 1 & 0 & 1 & 0 & 1 & 0 & 1 & 0 & 0 & 1 & 0 & 0 & 1 & 1 & 0 \\ & 0 & 0 & 1 & 0 & 0 & 1 & 0 & 1 & 0 & 1 & 0 & 1 & 1 & 0 & 0 & 1 \end{pmatrix} \begin{pmatrix} \vdots \\ x_{13} \\ \vdots \\ x_{28} \\ \vdots \end{pmatrix} \leq \begin{pmatrix} 1 \\ 1 \\ 1 \end{pmatrix},$$

where each row represents the load of one link (which in this example is 35% for arbitrary A⇔N link loads). The single-link failure bandwidth limit could represent linear inequalities used to limit the link bandwidth after a single link failure (without reallocation). The following represents one example of single-link failure bandwidth inequalities:

$$0.35 * \left( \ldots \left| \begin{array}{cc|cc|cc} 1 & 1 & 1 & 1 & 1 & 1 \\ 0 & 0 & 0 & 0 & 1 & 1 \\ 1 & 1 & 1 & 1 & 1 & 1 \\ 0 & 0 & 1 & 1 & 0 & 0 \\ 1 & 0 & 0 & 0 & 1 & 1 \\ 0 & 1 & 1 & 1 & 0 & 0 \end{array} \right| \ldots \right) \begin{pmatrix} \vdots \\ x_{13} \\ \vdots \\ x_{18} \\ \vdots \end{pmatrix} \leq \begin{pmatrix} 1 \\ 1 \\ 1 \\ 1 \\ 1 \\ 1 \end{pmatrix},$$

where the first two rows are the L2 and L3 bandwidths after an L1 failure, the second two rows are the L1 and L3 bandwidths after an L2 failure, and the last two rows are the L1 and L2 bandwidths after an L3 failure.

Using this type of vector 900, the following can be used to solve the optimization problem. The sum of the number of hops (links) on each used communication path can be expressed as:

$$f_1(x) = $$

$$(\ldots | 1\ 1\ 2\ 1\ 1\ 2\ 1\ 2\ 1\ 1\ 2\ 1\ 2\ 1\ 2\ 1 | \ldots) \begin{pmatrix} \vdots \\ x_{13} \\ \vdots \\ x_{28} \\ \vdots \end{pmatrix} = b_1 x.$$

The controller nodes' loads can be forced to an even distribution by minimizing the sum of squares of differences between the controller nodes' loads and their mean value. This can be expressed as:

$$C_{load} = $$

$$\begin{pmatrix} 0.5 & 0 & 0 & 0.3 & 0 & 0 & 0.4 & 0 & 0 & 0.4 & 0 & 0 \\ 0 & 0.5 & 0 & 0 & 0.3 & 0 & 0 & 0.4 & 0 & 0 & 0.4 & 0 & \ldots \\ 0 & 0 & 0.5 & 0 & 0 & 0.3 & 0 & 0 & 0.4 & 0 & 0 & 0.4 \end{pmatrix} \begin{pmatrix} x_1 \\ \vdots \\ x_{12} \\ \vdots \end{pmatrix},$$

$$\hat{C}_{load} = \frac{1}{n_C} 1_{n_C \times n_C} C_{load},$$

$$f_2(x) = (C_{load} - \hat{C}_{load})^T (C_{load} - \hat{C}_{load}),$$

which can help to ensure even controller node loads. Similarly, the following can be used:

$$f_3(x) = (L_{load} - \hat{L}_{load})^T (L_{load} - \hat{L}_{load}),$$

which can help force link loads to an even distribution. An overall optimality criterion could then be determined as follows:

$$f(x) = \sum_{i=1}^{3} f_i(x) = w_1 x^T A_1 x + w_2 x^T A_2 x + w_3 b_1 x,$$

where the three criteria above are mixed together by weighting factors $w_1$-$w_3$.

If link qualities $Q_i$ are known, the above overall optimality criterion can also be based on a fourth criterion value. The following can be used:

$$f_4(x) = (Q_1 Q_2 Q_3) L_{load},$$

which is an additional criterion used to extend the optimality criterion to maximize aggregate quality of used links. Only links with a quality above a threshold $Q_T$ could be used, and a new slack variables "link in use" could be expressed as:

$$Q_T \begin{pmatrix} x_{L1used} \\ x_{L2used} \\ x_{L3used} \end{pmatrix} \leq \begin{pmatrix} Q_1 \\ Q_2 \\ Q_3 \end{pmatrix}.$$

In this way, an optimality criterion can be determined for various distributions of control algorithms, and the optimal distribution could be selected using the values of the optimality criterion. As a result, the system manager 114 or the controller nodes could determine how to distribute control algorithms in an optimal or near-optimal manner.

Figure 12:
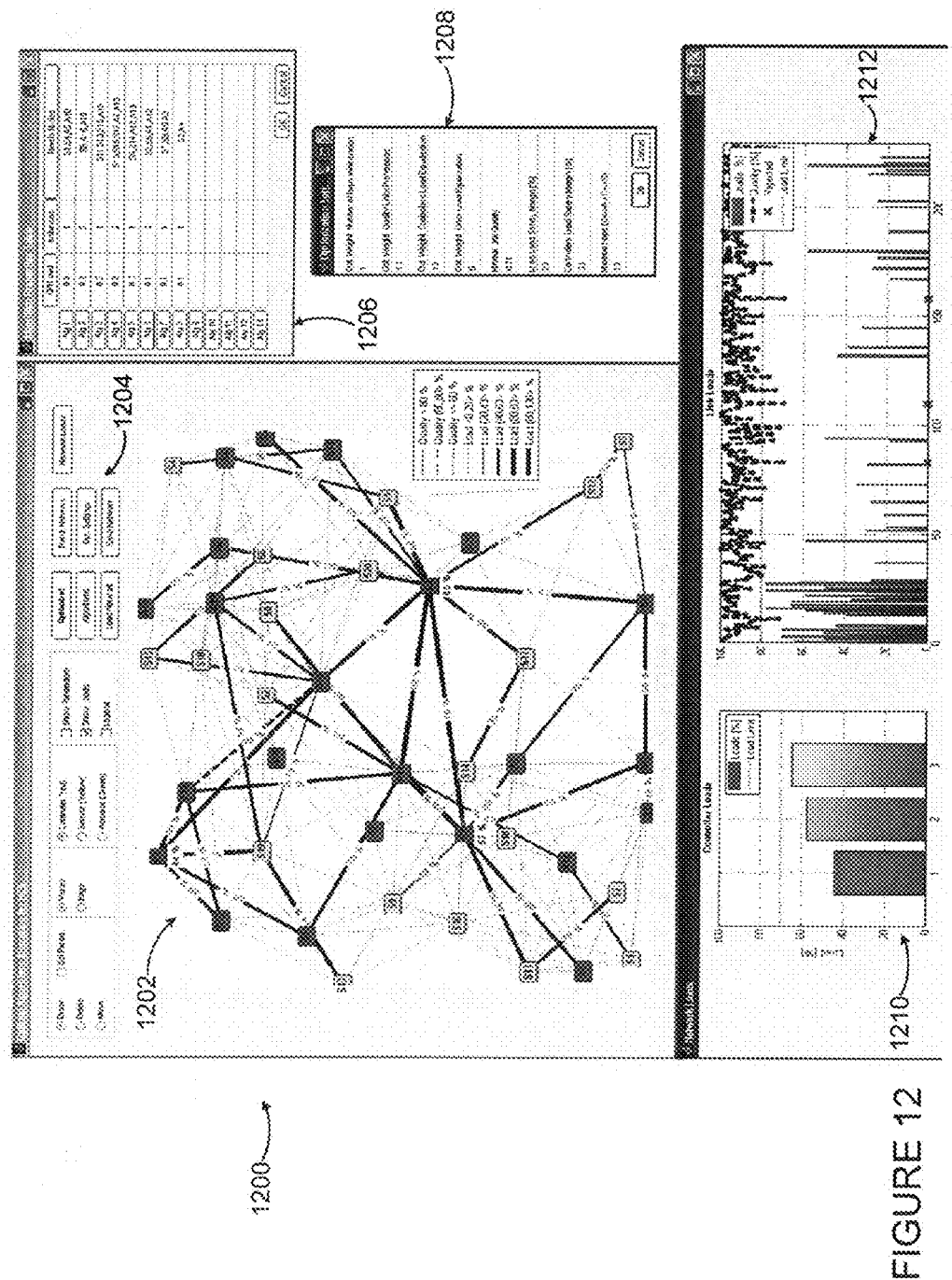

FIG. 12 illustrates an example graphical user interface (GUI) 1200 that could be used to present control algorithm distribution information to a user. In this example, the GUI 1200 includes a network map 1202, which identifies various controller, sensor, and actuator nodes in a network. Icons representing these nodes could have different colors, shadings, or other indicators distinguishing the node types. Also, various links between the controller, sensor, and actuator nodes are identified in the network map 1202. The links have a thickness, pattern, and/or color used to distinguish the loads on the links.

The GUI 1200 also includes controls 1204, which can be used to invoke various functions or to change the presentation of the network map 1202. The GUI 1200 further includes an algorithm properties table 1206, which identifies the CPU/processing load, number of instances, and needed sensor/actuator nodes for each algorithm. Optimization settings 1208 can be used to set various user-configurable settings, such as weights for different criteria used to generate an optimality criterion. The settings 1208 can also identify a minimal link quality, safety margins, and a maximum number of hops.

In addition, the GUI 1200 includes a controller load table 1210 and a link load table 1212. The controller load table 1210 identifies the load placed on each controller node and a controller load limit (which is based on the controller load safety margin). The link load table 1212 identifies the load placed on each link and a link load limit (which is based on the link load safety margin). The link load table 1212 can also identify the links' qualities, as well as any rejected links (which could be rejected for any number of reasons, such as excessively low quality).

Although FIGS. 8 through 12 illustrate example details regarding distribution of control algorithms among controller nodes in a wireless controller grid, various changes may be made to FIGS. 8 through 12. For example, while these figures illustrate specific techniques for allocating control algorithms amongst controller nodes, any other suitable technique(s) could be used.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A process control system comprising:
a plurality of wireless nodes including multiple controller nodes, each controller node configured to execute at least one of multiple control algorithms for controlling at least a portion of an industrial process, each control algorithm associated with at least one of: one or more sensor nodes or one or more actuator nodes;
wherein the controller nodes are configured to communicate over multiple wireless links;
wherein at least one of the wireless nodes is configured to (i) control a distribution of the control algorithms amongst the controller nodes by identifying a solution to an optimization problem and (ii) control an automatic redistribution of the control algorithms amongst the controller nodes in response to one or more detected changes in the process control system so that each of one or more of the control algorithms is executed by different controller nodes at different times;
wherein the optimization problem is associated with one or more constraints including at least one of: a computational power of each controller node, a bandwidth of each wireless link, or a quality of each wireless link; and
wherein the optimization problem is associated with one or more optimization factors including at least one of:
minimizing a total number of wireless links between each controller node and any sensor and actuator nodes associated with the control algorithm or algorithms executed by that controller node;
maximizing an aggregate wireless link quality of the wireless links between each controller node and any sensor and actuator nodes associated with the control algorithm or algorithms executed by that controller node;
equalizing a computing load on each of the controller nodes; or
equalizing a link load on each of the wireless links.

2. The process control system of claim 1, wherein the at least one wireless node is configured to control the automatic redistribution of the control algorithms amongst the controller nodes based on one or more triggering events.

3. The process control system of claim 2, wherein:
the one or more triggering events comprise a new controller node being added to the system; and
the at least one wireless node is configured to control the redistribution of the control algorithms amongst the controller nodes including the new controller node.

4. The process control system of claim 1, wherein the redistribution of the control algorithms changes at least one physical location where at least one of the control algorithms is executed without interrupting control of the industrial process.

5. The process control system of claim 1, wherein at least one of the controller nodes is further configured to perform at least one of: a sensing function or an actuator function.

6. The process control system of claim 1, wherein the wireless nodes are configured to form a wireless mesh network.

7. The process control system of claim 1, wherein the optimization factors include all of:
minimizing the total number of wireless links between each controller node and any sensor and actuator nodes associated with the control algorithm or algorithms executed by that controller node;
maximizing the aggregate wireless link quality of the wireless links between each controller node and any sensor and actuator nodes associated with the control algorithm or algorithms executed by that controller node;
equalizing the computing load on each of the controller nodes; and
equalizing the link load on each of the wireless links.

8. The process control system of claim 1, wherein:
multiple ones of the controller nodes are configured to execute a common one of the control algorithms;
at least one of the controller nodes is configured to function as a primary controller node to actively control at least the portion of the industrial process associated with the common control algorithm; and
at least one other of the controller nodes is configured to monitor the primary controller node, function as a backup controller node, and later become the primary controller node.

9. The process control system of claim 1, wherein:
one or more of the controller nodes and any sensor and actuator nodes associated with one of the control algorithms are configured to form a distributed control execution environment;
the nodes in the distributed control execution environment are configured to be substantially synchronized in time; and
at least one of the controller nodes forms part of multiple distributed control execution environments.

10. A process control system comprising:
a plurality of wireless nodes including multiple controller nodes, each controller node configured to execute at least one of multiple control algorithms for controlling at least a portion of an industrial process, each control algorithm associated with at least one of: one or more sensor nodes or one or more actuator nodes;

wherein at least one of the wireless nodes is configured to (i) control a distribution of the control algorithms amongst the controller nodes by identifying a solution to an optimization problem and (ii) control an automatic redistribution of the control algorithms amongst the controller nodes in response to one or more detected changes in the process control system so that each of one or more of the control algorithms is executed by different controller nodes at different times;

wherein the solution to the optimization problem comprises a vector having a first portion defining algorithm positions, a second portion defining alternative routing slack variables, and a third portion defining robustness slack variables.

11. The process control system of claim 10, wherein the at least one wireless node is configured to identify the solution to the optimization problem using binary quadratic programming.

12. A wireless node comprising:

a transceiver configured to communicate with other wireless nodes within a wireless controller grid of a process control system; and a controller configured to (i) control a distribution of multiple control algorithms for controlling at least a portion of an industrial process amongst the other wireless nodes by identifying a solution to an optimization problem and (ii) control an automatic redistribution of the control algorithms amongst the other wireless nodes in response to one or more detected changes in the process control system so that each of one or more of the control algorithms is executed by different wireless nodes at different times, each control algorithm associated with at least one of: one or more sensor nodes and one or more actuator nodes;

wherein the solution to the optimization problem comprises a vector having a first portion defining algorithm positions, a second portion defining alternative routing slack variables, and a third portion defining robustness slack variables.

13. The wireless node of claim 12, wherein the controller is further configured to cooperate with one or more of the other wireless nodes to dynamically distribute and redistribute the control algorithms amongst the wireless nodes.

14. The wireless node of claim 12, wherein the controller is configured to identify the solution to the optimization problem using binary quadratic programming.

15. The wireless node of claim 12, wherein:

the controller is configured to be substantially synchronized in time with one or more of the other wireless nodes and any sensor and actuator nodes associated with one of the control algorithms that form a distributed control execution environment; and the controller is configured to initiate communications in multiple distributed control execution environments.

16. The wireless node of claim 12, wherein the controller is further configured to execute at least one of the control algorithms.

17. The wireless node of claim 16, wherein the at least one control algorithm executed by the controller is selected based on a physical location of the wireless node.

18. The wireless node of claim 16, wherein the controller is further configured to:

function as a backup controller node and monitor at least one of the other wireless nodes that is functioning as a primary controller node; and later become the primary controller node.

19. The wireless node of claim 16, wherein the controller is configured to receive and execute different ones of the control algorithms over time as the control algorithms are dynamically distributed and the control algorithms are automatically redistributed in the wireless controller grid.

20. A method comprising:

executing at least one of multiple control algorithms for controlling at least a portion of an industrial process at a first wireless node in a wireless controller grid of a process control system, the wireless grid including multiple wireless nodes;

receiving and executing at least one different control algorithm at the first wireless node as the control algorithms are dynamically distributed and the control algorithms are automatically redistributed in the wireless controller grid in response to one or more detected changes in the process control system so that each of one or more of the control algorithms is executed by different wireless nodes at different times; and identifying a solution to an optimization problem associated with the distribution of the control algorithms in the wireless controller grid, the solution to the optimization problem comprising a vector having a first portion defining algorithm positions, a second portion defining alternative routing slack variables, and a third portion defining robustness slack variables.

21. The method of claim 20, further comprising:

cooperating with at least one second wireless node of the multiple wireless nodes to dynamically distribute and redistribute the control algorithms in the wireless controller grid.

22. The method of claim 21, wherein cooperating with the at least one second wireless node comprises determining how to migrate or copy at least one of the control algorithms to at least one other wireless node in the wireless controller grid that is capable of executing the at least one control algorithm.

23. The method of claim 20, wherein identifying the solution to the optimization problem comprises identify the solution to the optimization problem using binary quadratic programming.

24. A wireless node comprising:

a transceiver configured to communicate with other wireless nodes within a wireless controller grid of a process control system, the wireless nodes associated with multiple wireless links; and a controller configured to (i) control a distribution of multiple control algorithms for controlling at least a portion of an industrial process amongst the other wireless nodes by identifying a solution to an optimization problem and (ii) control an automatic redistribution of the control algorithms amongst the other wireless nodes in response to one or more detected changes in the process control system so that each of one or more of the control algorithms is executed by different wireless nodes at different times, each control algorithm associated with at least one of: one or more sensor nodes and one or more actuator nodes;

wherein the optimization problem is associated with one or more constraints including at least one of: a computational power of each controller node, a bandwidth of each wireless link, or a quality of each wireless link; and wherein the optimization problem is associated with one or more optimization factors including at least one of:

minimizing a total number of wireless links between each controller node and any sensor and actuator nodes associated with the control algorithm or algorithms executed by that controller node;

maximizing an aggregate wireless link quality of the wireless links between each controller node and any sensor and actuator nodes associated with the control algorithm or algorithms executed by that controller node;

equalizing a computing load on each of the controller nodes; or equalizing a link load on each of the wireless links.

* * * * *